United States Patent [19]
Crompton

[11] 3,803,910
[45] Apr. 16, 1974

[54] WIND TURBULENCE METERING
[76] Inventor: George Crompton, 710 Armada Rd., South, Venice, Fla. 33595
[22] Filed: Nov. 6, 1972
[21] Appl. No.: 303,813

[52] U.S. Cl. .................................. 73/188
[51] Int. Cl. ............................. G01w 1/00
[58] Field of Search ...................... 73/188

[56] References Cited
FOREIGN PATENTS OR APPLICATIONS
293   1870   Great Britain .................. 73/188

Primary Examiner—James J. Gill
Assistant Examiner—Anthony V. Ciarlante
Attorney, Agent, or Firm—George Crompton

[57] ABSTRACT

A weather vane is connected to a rotatable part by a one way in azimuth drive, such as a pawl and ratchet mechanism, and when the part has been moved angularly a specific number of degrees a signal is given and the time interval can be measured by a stop watch.

2 Claims, 5 Drawing Figures

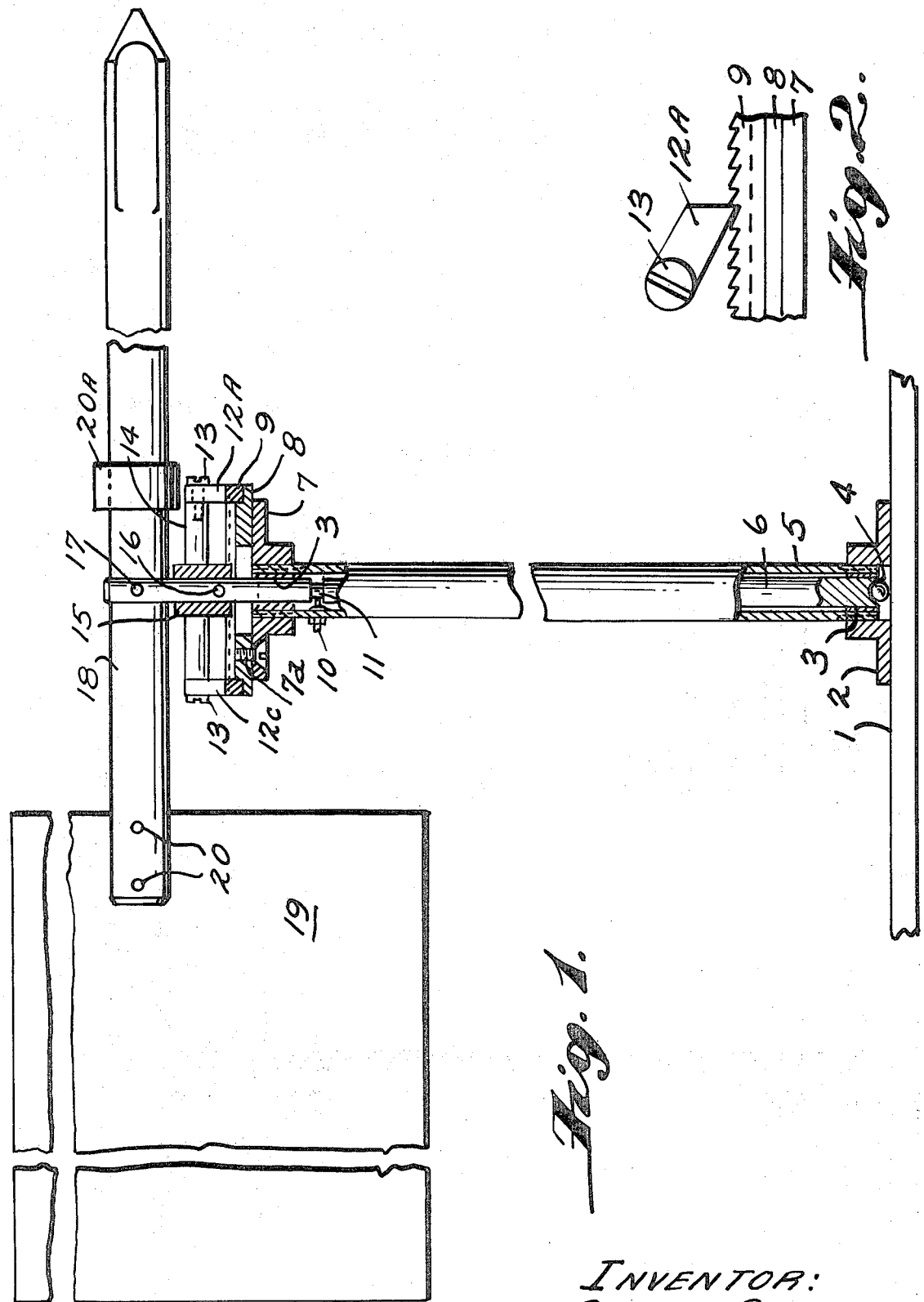

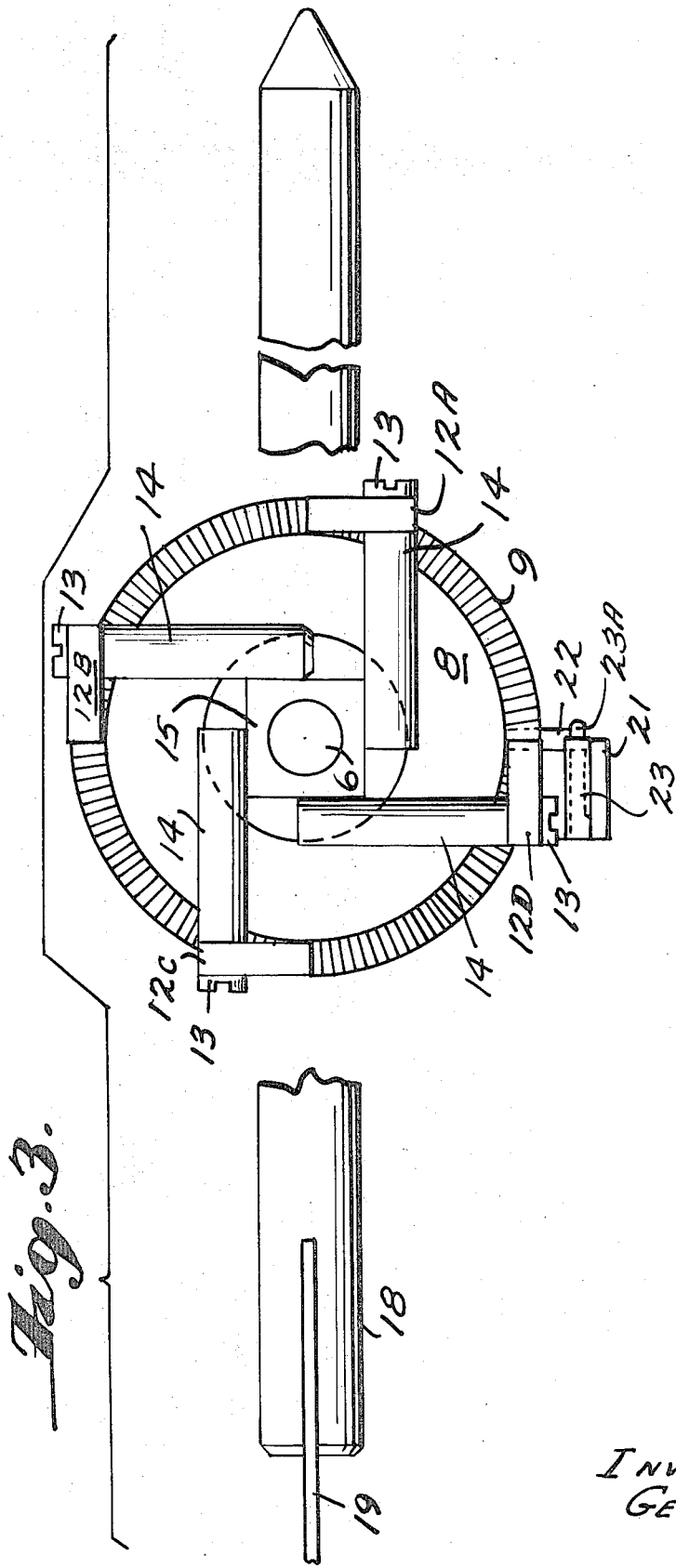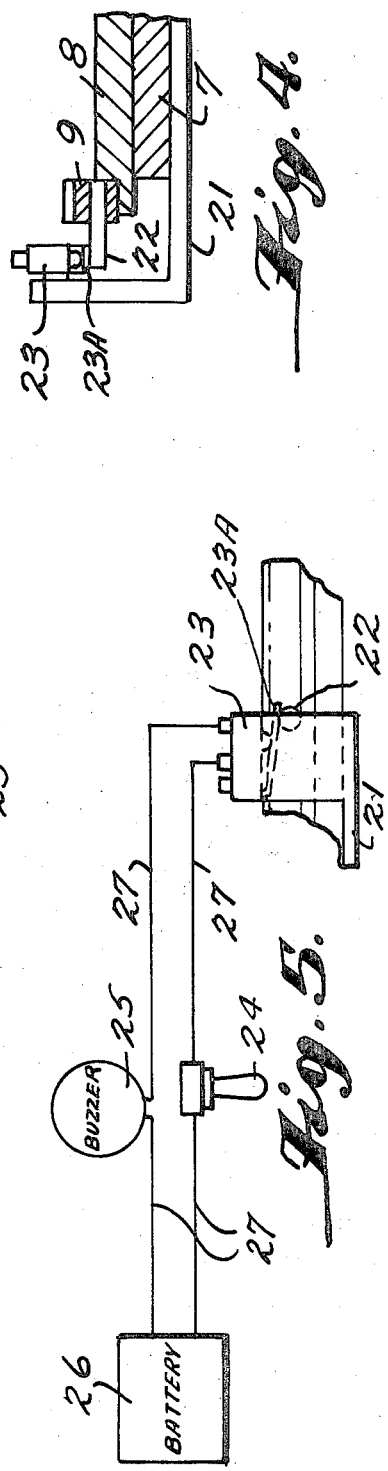

WIND TURBULENCE METERING

This invention relates to wind indicators and and to the measurement of turbulance.

One object of the invention is to measure the turbulence of the wind over a short interval of time. While turbulence in a vertical direction is a factor, it is sufficient to measure turbulence in azimuth, since they are about the same and furthermore turbulence in azimuth is a fairer indicator of net turbulence since the ground and buildings erratically affect vertical turbulence more than they do turbulence in azimuth.

Another object of the invention is to provide a simple instrument and to that end my invention measures the reciprocal of turbulence which is the smoothness of the wind. This I do in this illustrative embodiment of the invention by measuring the time between total azimuth changes, for example the time it takes the wind to change azimuth, measured in one angular direction, a total of 360°, or one circle, or four quadrants, or 32 points.

Another object of the invention is to improve weather measuring for aircraft, and in this connection a report that the turbulence is now 22 is a report that it took 22 seconds of time for the azimuth change to make 360°. Another object of the invention is to provide a reliable instrument for measuring turbulence. The giant rigid airship Shenandoah, under the command of my friend the late Lieutenant Commander Zachary Lansdowne, U.S.N., was destroyed by turbulence in 1925, not by wind velocity or air speed. She entered a line squal over Ohio, sometimes called a cold front. The turbulence, that is the change in wind vector, destroyed the Shenandoah, broke her girders. My instrument does not measure the change of wind speed components of the change of wind vector, but it is roughly proportional to the change of azimuth component and the former can be seen by the movement of the needle of an anemometer.

Other objects will be apparent or pointed out hereinafter.

In the accompaning drawings illustrating one of many possible embodiments of the mechanical features of the invention:

FIG. 1 is a view, partly in elevation and partly in section of the turbulence meter, FIG. 2 is an elevation of a portion of the ratchet ring, a pawl engaging the same and the retaining ring for the ratchet ring, FIG. 3 is a plan view of the turbulence meter, FIG. 4 is a sectional and elevational view of a portion of a pipe collar, the retaining ring, the ratchet ring, the actuating pin, the switch and the supporting bracket for the switch, FIG. 5 is a side elevation of the parts of FIG. 4 plus an electrical diagram.

Referring to FIG. 1, a base 1 can be made of steel plate, resistant to rusting and is fastened by screws or bolts to the top of a building, for example the roof of an airport tower. To the base 1 is fastened as by screws, a pipe collar and flange 2. A bronze bushing 3 inside of the collar 2 encloses a steel bearing ball 4 which rests upon the base plate 1. The bushing 3 is press fitted into a pipe 5 which can be of rust resistant steel or galvanized. The bottom bronze bushing 3 and another one at the top of the pipe 5 journal a steel shaft 6 which extends the length of the pipe 5 and above it at the top. At the bottom it is shown coned to center the ball 4. The pipe 5 is held in place on the base 1 by the pipe collar 2.

Another pipe collar and flange is secured to the top of the pipe 5 and it supports a retaining ring 8 which is held from angular and radial motion relative to the pipe collar 7 by a pin 7a. The retaining ring 8 supports and centers a ratchet ring 9 which is shown as a crown ratchet but could be a peripheral ratchet if the pawls were spring pressed or operated by weights and levers. See also FIG. 2 for the relationship of the collar 7, ring 8 and crown ratchet 9. The ratchet ring 9 can be made of bronze and the retaining ring 8 of stainless steel. A dog point screw 10 extending into a groove 11 in the shaft 6 holds the latter in place axially but in many embodiments this is a superfluity.

Referring to FIGS. 1, 2 and 3, I provide four pawls 12A, 12B, 12C and 12D (e.g. of stainless steel or bronze) pivoted on shoulder screws 13 extending into arms 14 affixed to the sides of square collar 15 pinned by a pin 16 through the shaft 6. It will be seen that as the shaft 6 oscillates in azimuth by changes in the wind azimuth, the pawls 14 move the ratchet ring 9 at intervals but in one direction only, and the pawls 14 are of slightly different lengths to bridge the gap between teeth.

Referring now to FIGS. 1 and 3, a pin 17 through the shaft 6 extends through a shaft 18 which holds a wind vane or tail 19 at one end. The shaft 18 can be slotted vertically and the vane can be held thereon by pins 20. As an example the vane 19 can be made of aluminum plate and its large surfaces can be planes. It is best to have standard sizes (but any size within reason can be selected by the manufacturer) so that the results from different instruments at different points will be comparable. In the English system one foot square is recommended, in the C.G.S. system, 30 centimeters square, but this is advisory only. It is well to have a counter weight 20A slidably mounted on the shaft 18 on the side opposite the vane 19 and when the exact balance has been found the counter weight 20A can be fixed in place by drilling and pinning. Some standard distance from the edge of the vane 19 to the center of the shaft 6 should be adopted.

Referring now to FIGS. 4 and 5, the flange of the pipe collar 7 has secured thereto a bracket 21. A pin 22 extends radially from the ratchet ring 9 and once in every 360° of angular movement (32 points or four quadrants or one circle) engages and operates the ramp 23a of a push and release switch 23 (you can buy these) which is supported by the bracket 21. As shown in FIG. 5 a circuit switch 24, a buzzer 25 and a battery 26 are connected in series by wires 27 with the switch 23 so that, the switch 24 being closed, whenever the pin 22 pushes the plunger of the switch 23 the circuit is closed and the buzzer 25 makes a sound. The ramp 23a multiplies the length of the buzz manyfold so that even in a turbulent gale there will be a sound that can be heard. The buzzer 25 could be an electric bell or an electric pen of a clock work graph machine or the input to a computer. I can refer to it as an indicator. Make the ring 9 out of iron or steel, a pawl 12 of magnetic material such as Alnico and magnetize it, flatten the end, and you can eliminate the ratchet teeth and the apparatus will work, but the angle of the "pawl" to the plane of the ring should be nearer to a right angle.

The observer, using my wind turbulence meter, sits watching the meter of an anemometer if desired, and starts a stop watch when he hears the buzzer or bell. He stops the watch when he hears the buzzer again and reads the seconds (of time) and he has a record of seconds per 32 points or one circle, and this is the smoothness of the air, the greater number of seconds elapsed, the smoother is the air and this is the reciprocal of turbulence.

The shaft 6 is a journal for the vane 19, and though the shaft is inside the ring 9, the journal could be a cylinder outside the ring. It is sufficient that they are coaxial. The wind vane 19 is journalled for oscillation by the wind and for angular rotation to any extent in either direction. I have seen the cup rotor of my anemometer rotating reversely, and since the motive force is drag differential, that is impossible except for a gust whirl like a dust devil. The incremental angular actuating means operated by movement of the wind vane is the ratchet ring and the pawls. A magnet on an inclined arm would work. The actuator is the pin 22. The indicator is the buzzer 25. The means to operate the indicator is shown in FIG. 5 and described.

I show one actuator, the pin 22 in the ratchet ring 9. But there could be two, set 180° apart. Then the indicator would be operated after every 180° of azimuth change. There could be three pins 22, set 120° apart. There could be four pins 22 set 90° apart, eight set 45° apart, or more or fewer. For different installations a particular number of pins would be the best, and pins could be added and removed.

On the other hand the pin 22 or pins 22 could operate a rimless spoke wheel, like of a Veeder counter, the number of spokes was usually five, and one spoke could have a point to engage a brush, so that the indicator would be operated after $5 \times 360° = 1,800°$ of azimuth change, for example. So many variations can be made in the counting.

All recommendations of dimensions and of materials are advisory only. It will thus be seen that there has been provided by this invention a wind turbulence meter and a method of metering in which the various objects hereinbefore set forth together with many thoroughly practical advantages are successfully achieved. As many possible embodiments may be made of the above described invention and as many changes can be made in the embodiment set forth, it is to be understood that all mater herein set forth is to be taken as illustrative and not in a limiting sense.

I claim:

1. The method of determining wind turbulence which comprises measuring the azimuth change by a one way in azimuth drive exemplified by a wind vane driving a pawl and ratchet mechanism including the rotational timing of one of said pawl and ratchet, noting a signal when the mechanism is at a selected point in azimuth change, noting another signal when the mechanism is at another point in azimuth change and timing the interval between the signals.

2. Method according to claim 1 in which more than one signal is given and noted in each 32 points (360°) in one direction of azimuth change.

* * * * *